United States Patent [19]

Ishii

[11] Patent Number: 4,570,259
[45] Date of Patent: Feb. 11, 1986

[54] DATA TRANSMISSION ON EQUIPMENT INCLUDING A PLURALITY OF DATA STATIONS CONNECTED BY A COMMON TRANSMISSION LINE

[75] Inventor: Tetsuo Ishii, Hyogo, Japan

[73] Assignee: Mitsubishi Denki Kabushiki Kaisha, Tokyo, Japan

[21] Appl. No.: 395,902

[22] Filed: Jul. 7, 1982

[30] Foreign Application Priority Data

Dec. 16, 1981 [JP] Japan ................................. 56-204641

[51] Int. Cl.[4] .............................................. H04J 3/00
[52] U.S. Cl. ......................................... 370/86; 370/89
[58] Field of Search ................ 370/86, 89; 340/825.05

[56] References Cited

U.S. PATENT DOCUMENTS

| | | | |
|---|---|---|---|
| 3,764,981 | 10/1973 | Takasugi ................................ | 370/86 |
| 3,940,561 | 2/1976 | Heinze et al. ......................... | 370/86 |
| 4,002,842 | 1/1977 | Meyr et al. ............................ | 370/86 |
| 4,335,426 | 6/1982 | Maxwell et al. ...................... | 370/86 |

Primary Examiner—Marc E. Bookbinder
Assistant Examiner—Kenneth I. Rokoff
Attorney, Agent, or Firm—Bernard, Rothwell & Brown

[57] ABSTRACT

Data transmission equipment includes a plurality of data stations connected in series through a loop transmission path. A synchronizing station is connected to the data stations in the loop transmission line. The synchronizing station generates transmission signals made up of a synchronizing slot, an address slot and data transmission slots. A display board for setting and displaying data is connected to at least one of the data stations. Process line controllers are connected to data stations to transmit data related to process control to, or receive data from, a process control apparatus. The data transmission equipment further includes sensor bases connected to data stations. Each data station includes a coupling unit connected in series with the loop transmission line, transmitting and receiving units connected to the coupling unit through a bus, input units provided between the transmitting units and the sensor bases, and a bus provided between the transmitting units and the sensor bases. One embodiment of the equipment includes a buffer memory and an output buffer memory which holds the contents of the buffer memory until they are stored in an output memory.

1 Claim, 11 Drawing Figures

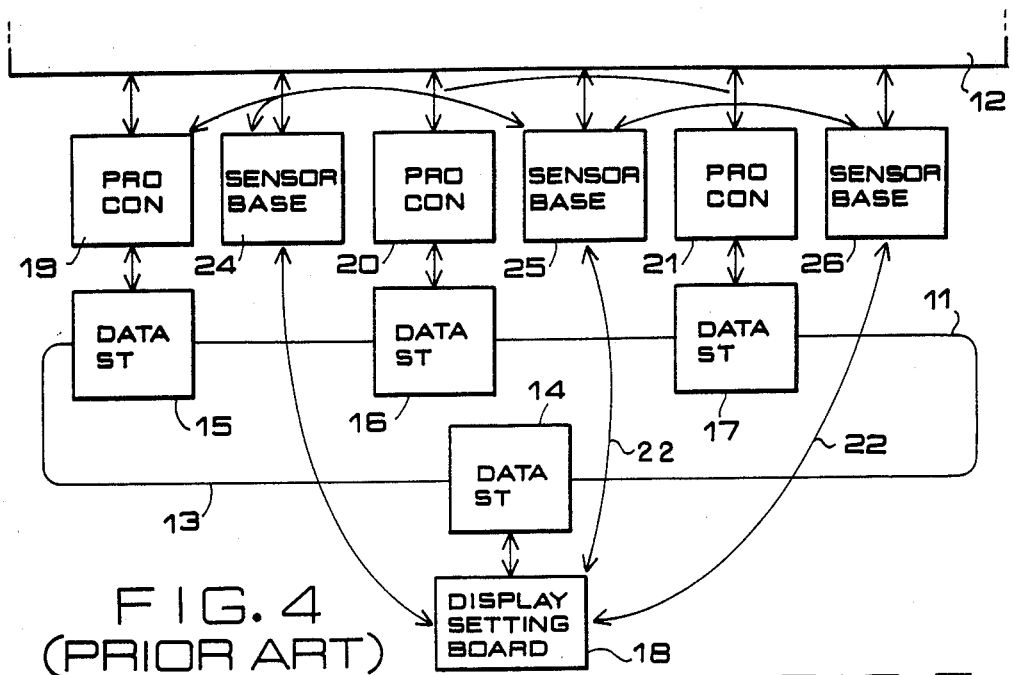
FIG. 4 (PRIOR ART)
FIG. 5
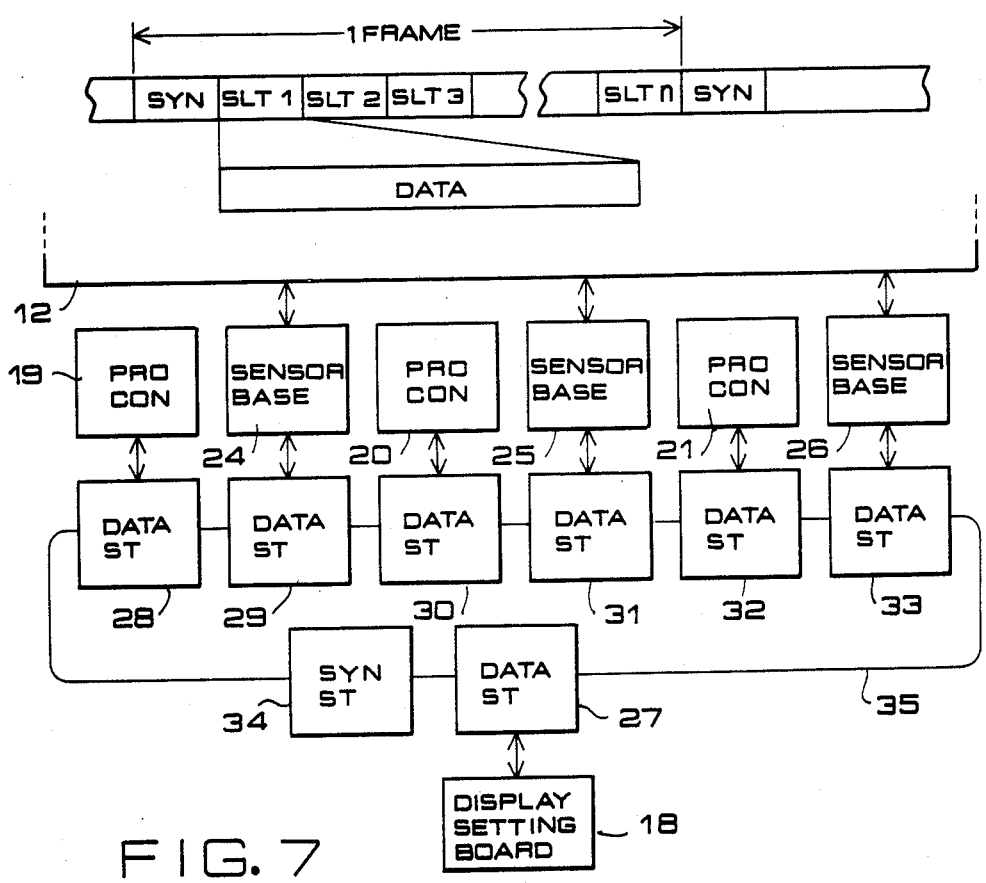
FIG. 7

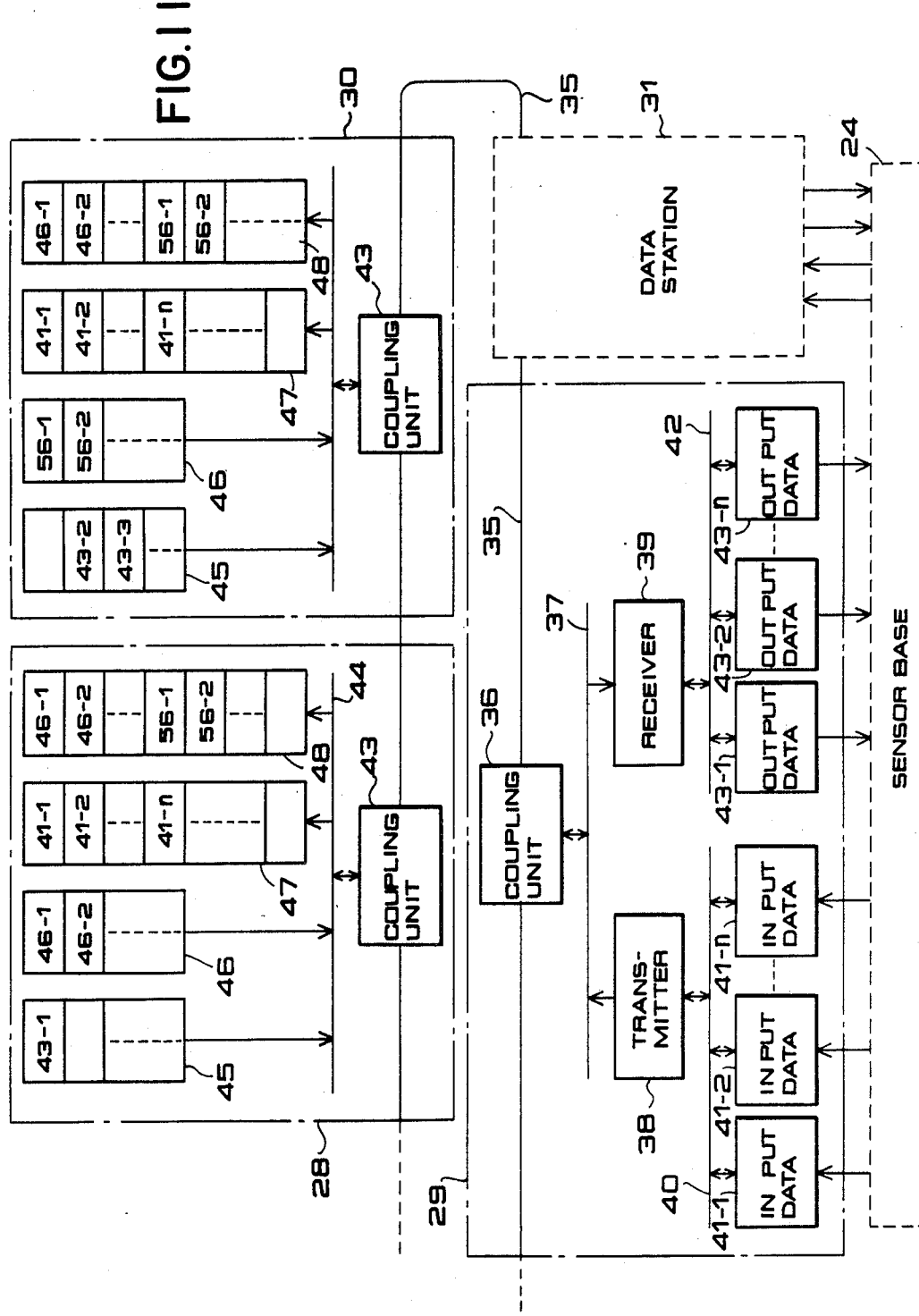

DATA TRANSMISSION ON EQUIPMENT INCLUDING A PLURALITY OF DATA STATIONS CONNECTED BY A COMMON TRANSMISSION LINE

BACKGROUND OF THE INVENTION

1. Field of the Invention

The present invention relates to a data transmission equipment which connects a plurality of data stations via a common transmission line, and more specifically to a data transmission equipment which transmits the data of a process control apparatus cyclically.

2. Description of the Prior Art

The data transmission equipment used for the process control apparatus must be capable of efficiently transmitting at high speeds the data of even small amounts that are sporadically produced by many sensors arrayed on a process line, as well as the data of large amounts produced by a process line control apparatus or the like.

According to the conventional data transmission terminal of this type, a main station 1 is connected to local stations 4a to 4c in the form of a loop through transmission lines 2, as shown in FIG. 1. The main station 1 transmits the data to, or receives the data from, input/output devices 5 that are connected to the local stations 4a to 4c.

FIG. 2 illustrates the internal construction of the local station 4a. Namely, a signal converter 6 converts into parallel signals serial signals transmitted to the local station 4a via transmission line 2. The signal converter 6 further converts parallel signals in the local station 4a into serial signals and transmits them to the transmission line 2. A timing controller 7 takes timing in the local station 4a, and an address memory 8 stores address data from the transmission line 2. A multiplexer 9 selects input data 61 depending upon the address, and a demultiplexer 10 distributes the data transmitted through the transmission line 2 to an output memory 60 depending upon the address. The output memory 60 produces process outputs 62.

Operation of the conventional apparatus of FIGS. 1 and 2 will be described below with reference to FIG. 3.

The main station 1 transmits signals to, and receives signals from, the process input/output devices 5 via local stations 4a to 4c that are connected in the form of a loop through the transmission line 2. As shown in FIG. 3, the main station 1 produces the data, i.e., transmits synchronizing data SYNC, address data ADRS, and data 1 to n corresponding to the address, to the local station 4a through the transmission line 2. After having taken the synchronism, the local stations send the data to the process input/output devices 5 which correspond to each of the addresses or the data are written on slot DATA 1 to n. The main station 1 reads the data that are introduced. The next address data are then transmitted and received. The above-mentioned operation is repeated to transmit and receive all data.

Setup of the local station 4a of FIG. 2 will be mentioned below in further detail. Serial signals introduced through the transmission line 2 are converted into parallel signals by the signal converter 6. In this case, the signals are synchronized relying upon a synchronizing signal that is transmitted for the first time as shown in FIG. 3. The next address signal ADRS is stored in the address memory 8. The data DATA 1 to n transmitted subsequently are input to the output memory 60. The data are written on the output memory 60 specified by addresses, relying upon the demultiplexer 10 and relying upon the signals that are stored in the address memory 8 and that are selected by addresses. The timing controller 7 controls the timing, and the data written on the output memory 60 are transmitted to the process outputs 62. The next synchronizing signal SYNC is transmitted to the transmission line 2, followed by the address signals and the data signals. As a matter of course, the address in this case is +n relative to the address of the previous time, and the data corresponding to the new address are transmitted. The above-mentioned operation is repeated so that all of the output data are transmitted to the local stations 4a to 4c.

Below is mentioned input data 61 transmitted from the process input/output devices 5. The synchronism is maintained by the synchronizing signal transmitted via the transmission line 2, and the address data ADRS are stored in the address memory 8. Depending upon the address ADRS, the multiplexer 9 selects the input data 61 from the process input/output devices, and transmits them to the signal converter 6 which converts parallel signals into serial signals and superposes them on the slots of DATA 1 to n of FIG. 3. The main station 1 reads the data and advances the address by +n, and then reads the next data. The above-mentioned operation is repeated to read all of the input data. That is, the above-mentioned operation is carried out cyclically to transmit all of the input/output data.

According to the above-mentioned conventional apparatus, however, when the outputs are to be produced to many process input/output devices, the data must be written on the output memory 60 through demultiplexer 10 consuming extended periods of time. In worst cases, therefore, the next data will be produced before the data are all written on the output memory 60. When the data are to be introduced, furthermore, the multiplexer is operated after the address is discriminated and, then, the input data is introduced, giving rise to the occurrence of time lag. Consequently, the data may not often be superposed on the specified slots. This becomes a problem particularly when there are many inputs and outputs, and when the addresses and data are to be transmitted through a bus over a long distance.

There has further been proposed a data transmission equipment as shown in FIG. 4. Namely, the data transmission equipment 11 transmits a variety of data related to the process control apparatus 12. The data transmission terminal equipment has data stations 14 to 17 connected through a loop transmission line 13, a display setting board 18 which is connected to the data station 14 and which sets and displays the data, and process line controllers 19 to 21 connected to the data stations 15 to 17. The process line controllers 19 to 21 transmit the data related to process control to, or receive them from, a process control apparatus 12. The data transmission equipment 11 further possesses sensor bases 24 to 26 that are connected to the display setting board 18 via cables 22. To transmit the data through the loop transmission line 13, the data station 14 also functions as a synchronizing station which forms transmission signals consisting of a frame which is shown in FIG. 5.

Each frame has a synchronizing slot SYN and data slots $SLT_1$ to $SLT_n$ that are suitably allocated to the data stations 14 to 17 and that work to transmit the data DATA. The frames are continuously transmitted to the loop transmission line 13.

With the above-mentioned conventional data transmission equipment, however, the sensor bases are connected to the display setting board, resulting in complicated construction. If the sensor bases are connected to the loop transmission line, the data of sensor bases exhibit quite different natures and, hence, the transmission efficiency of the data transmission terminal equipment greatly decreases. Further, the same input signal is introduced by each of the process line controllers, or the signal introduced by any process line controller must be transmitted to other process line controllers through the loop transmission line. Accordingly, the transmission efficiency decreases greatly.

SUMMARY OF THE INVENTION

An object of the present invention is to provide a data transmission equipment which is free from the defects inherent in the above-mentioned conventional art, and which is capable of transmitting the data at high speeds.

Another object of the present invention is to provide a data transmission equipment which can maintain good transmission efficiency even when the data is transmitted in varying amounts, and which can be connected to all of the common transmission lines to offer advantage in economy.

BRIEF DESCRIPTION OF THE DRAWINGS

FIG. 4 is a block diagram showing another conventional data transmission apparatus;

FIG. 5 is a constituent diagram of transmission signals on loop transmission path shown in FIG. 4;

FIG. 7 is a block diagram showing a data transmission apparatus according to a further embodiment of this invention;

FIG. 11 is a detailed view to explain operation of FIG. 7.

DESCRIPTION OF A PREFERRED EMBODIMENT

Figure 1:
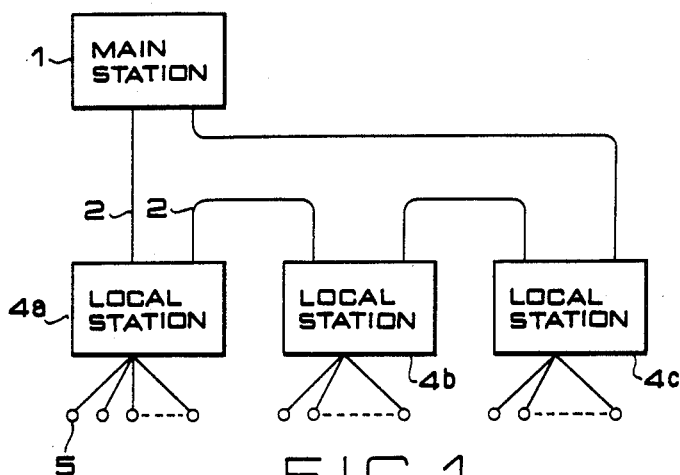
FIG. 1 is a block diagram showing a conventional data transmission apparatus.
Figure 2:
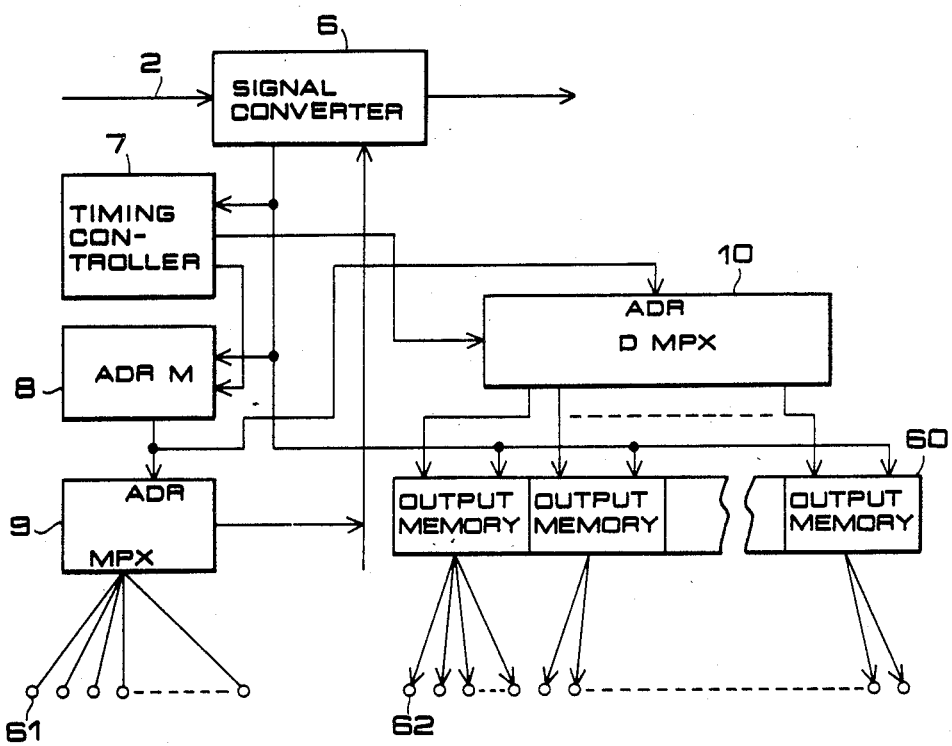
FIG. 2 is a block diagram showing an internal construction showing a local station in FIG. 1.
Figure 3:
FIG. 3 is an explanatory view to explain the operations of FIGS. 1 and 2.
Figure 6:
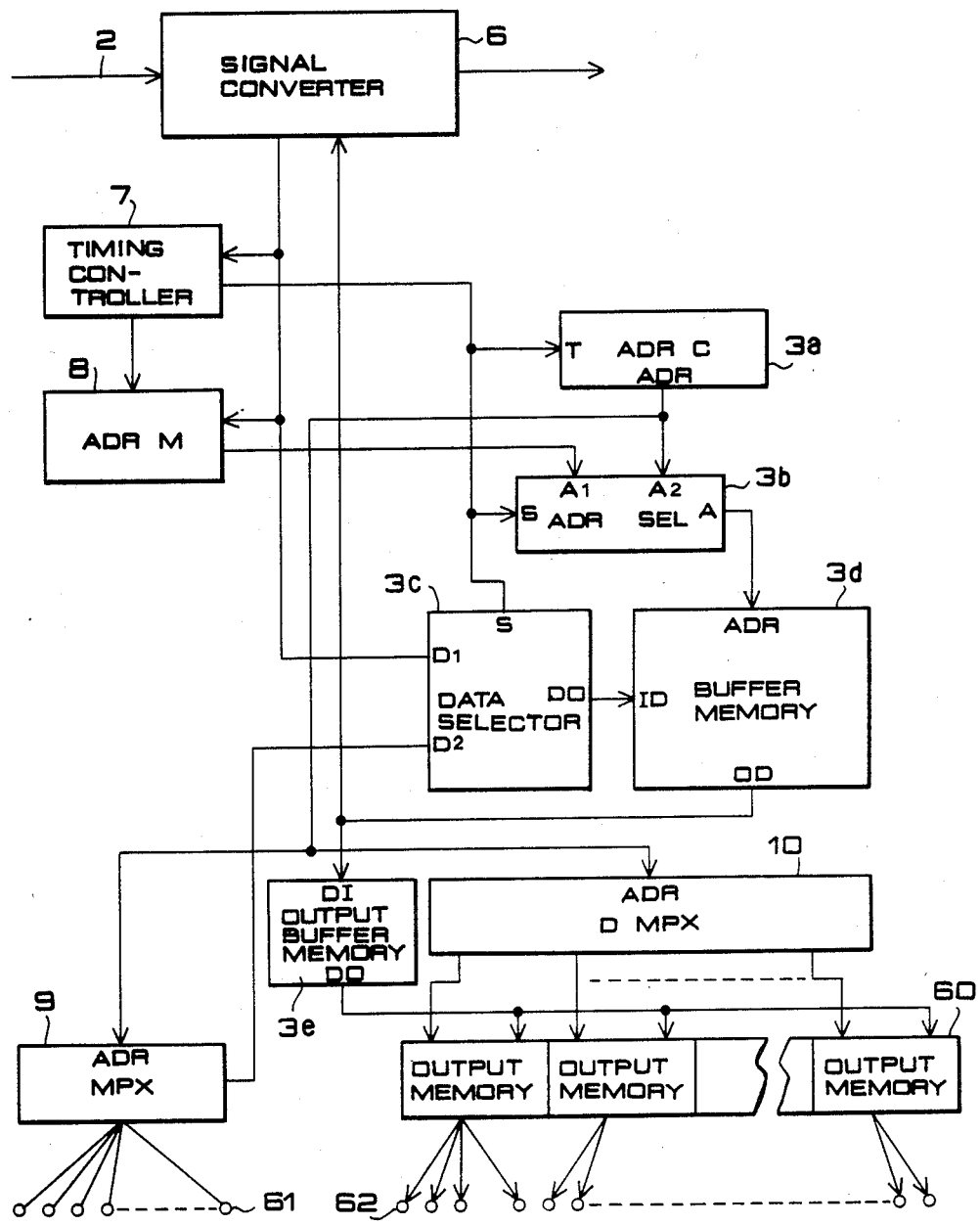
FIG. 6 is a block diagram showing an internal construction of a local station of a data transmission apparatus according to one embodiment of this invention.

FIG. 6 illustrates an embodiment of the present invention, in which the same portions as those of FIGS. 1 and 2 are denoted by the same reference numerals. In FIG. 6, an address counter 3a cyclically scans the addresses of the multiplexer 9 and the demultiplexer 10. An address selector 3b switches the addresses in the buffer memory 3d. A data selector 3c switches input data of a buffer memory 3d. An output buffer memory 3e holds the contents of the buffer memory 3d until those are stored in the output memory 60.

In the thus constructed apparatus, serial signals sent through the transmission line 2 are converted into parallel signals by the signal converter 6. In this case, the signals are synchronized by the synchronizing signals introduced through the transmission line 2, and the addresses are stored in the address memory 8. The data DATA 1 to n transmitted subsequent to the addresses are stored in the buffer memory 3d. Responsive to the instruction of a timing controller 7, the address selector 3b selects the address transmitted from the address memory 8, and the data selector 3c selects the data transmitted through the data transmission line.

The data stored in the buffer memory 3d is also read responsive to the instruction of the address selector 3b. The serial signals obtained through the signal converter 6 are transmitted to the main station 1 via the transmission line 2. In this case, therefore, the signals need be transmitted to, and received from, the buffer memory 3d only, maintaining high speeds. Further, the address is set in the buffer memory 3d by the address counter 3a. Similarly, the input signals from the process input terminals 61 are selected by the multiplexer 9 responsive to the signals from the address counter 3a, and are written onto the buffer memory 3d through the data selector 3c. Thus, even though extended periods of time may be required before many input data are introduced, the time occupied by the buffer memory 3d can be shortened.

Contents of the buffer memory 3d specified by the address counter 3a are then stored in the output buffer memory 3e, and the buffer memory 3d is opened. Contents of the output buffer memory 3e are transmitted to the output memory 60. The data is written on the output memory 60 which is selected by the demultiplexer 10 responsive to the address of the address counter 3a, and the signals are transmitted to the process output terminals 62. In this case also, the time for transmitting the data is not delayed even when the operation is delayed after the buffer memory 3e has operated, i.e., even when extended periods of time are required for selecting the output memory 60; i.e., the data can be transmitted at high speeds. Here, however, the address selector 3b and the data selector 3c must be so switched that the signals transmitted through the transmission line are synchronized, and that the signals of the buffer memory 3d are in agreement with the addresses.

Although the above-mentioned embodiment has dealt with the case when there are three local stations, it should be noted that no limitation is imposed on the number of the local stations. Further, the data can be transmitted not only at a ratio 1:N between the main station 1 and the local stations 4a to 4c, but also the data can be transmitted at a ratio N:N.

Another embodiment of the invention will be described below in conjunction with FIG. 7.

In FIG. 7, a data station 27 is connected to the display setting board 18, data stations 28, 30 and 32 are connected to the process line controllers 19 to 21, and data stations 29, 31, 33 are connected to sensor bases 24, 25 and 26. The data stations 27 to 33 and the synchronizing station 34 are connected to the loop transmission line 35. The synchronizing station 34 has a function to generate transmission signals which consist of a frame shown in FIG. 8. Namely, the frame is made up of a synchronizing slot SYN, an address slot ADR, and data transmission slots IO1 to IOm (m is an integer of 1, 2, 3, —and is 4 in this embodiment).

Figure 9:
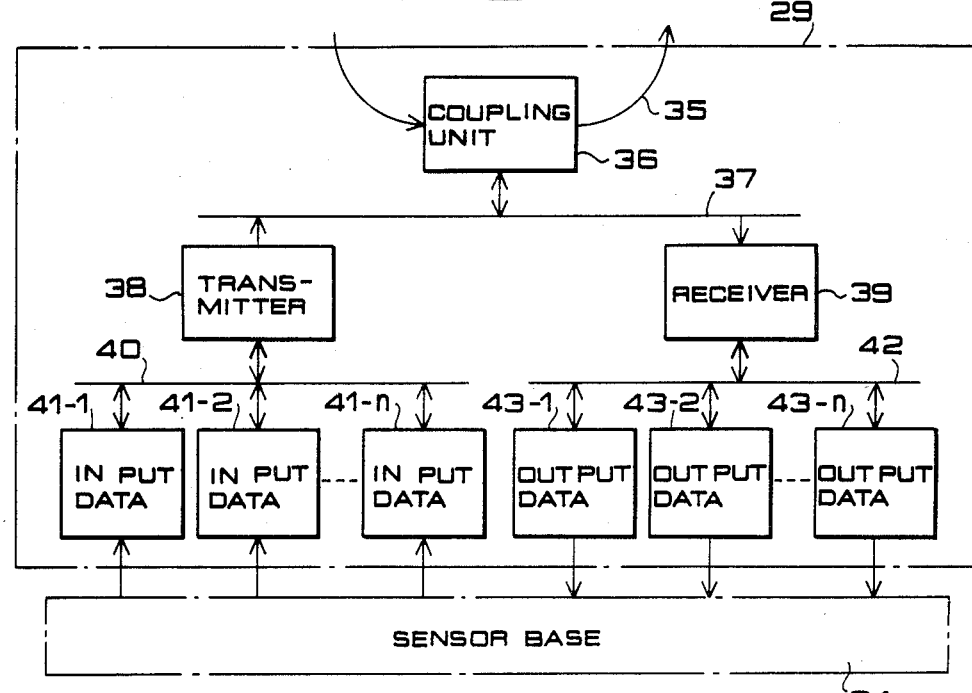
FIGS. 9 and 10 is block diagrams showing detailed construction of a data station shown in FIG. 3.

FIG. 9 is a block diagram showing the construction of the data station 29. Other data stations 31, 33 are also constructed in the same manner. A coupling unit 36 is connected in series with a loop transmission line 35, and is also connected to a transmitting unit 38 and to a receiving unit 39 via a bus 37. The transmitting unit 38 is further connected to a sensor base 24 via a bus 40 and input units 41-1 to 41-n.

Figure 10:
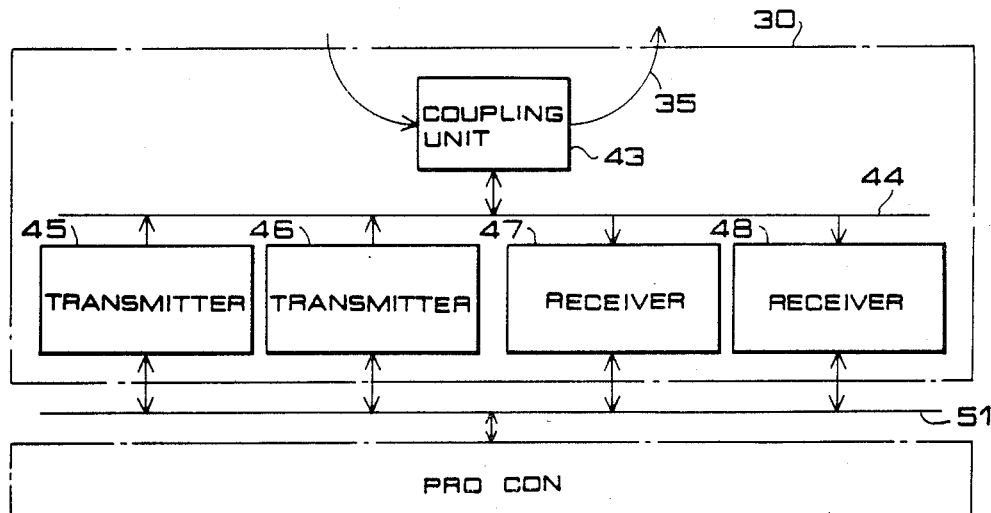

FIG. 10 is a block diagram illustrating the construction of the data station 30. Data stations 28, 32 have also been constructed in the same manner. In FIG. 10, a coupling unit 43 is connected in series with the loop transmission line 35, and transmitting units 45, 46 and receiving units 47, 48 are connected to the process line controller 20 via a bus 51. The transmitting units 45, 46 have a data memory. When the data are to be transmitted, the data memory is scanned according to addresses introduced through the transmission line 35, and the data which are read out are transmitted to the bus 44. The receiving unit 47 has an image memory for a group of process input units, and has an image memory for a group of receiving units.

FIG. 11 is a block diagram which illustrates the operation of the data transmission equipment according to the present invention.

Figure 8:
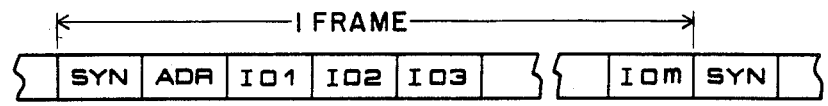
FIG. 8 is a constituent diagram of transmission signals of a loop transmission apparatus shown in FIG. 7.

As the address slot of a frame shown in FIG. 8 is transmitted to a data station having that address, the data station superposes the data on the data slots IO1 to IOm (FIG. 8), and each of the stations takes or produces the contents. In FIG. 11, the data stations 28, 30 are connected to the process line controller, and are further connected to the data stations 29, 31. A data 43-1 in a transmitting unit in the data station 28 is superposed on a specified data slot, and is transmitted to the data station 29 via the transmission line. A data 43-2 in the transmitting unit 45 of the data station 30 is also sent to the data station 29 in the same manner as above. The input 41-1 supplied to the data station 29 is also input to the data memory in the receiving units 47 of the data stations 28, 30 via the transmission line. Thus, the output of the process line controller is supplied to the sensor bases, and input to the sensor bases is introduced by the process line controller. Through the same line, furthermore, the data in the transmitting unit 46 of the data station 28 is further written on the receiving units 48 of the data stations 28, 30. Therefore, output of a data station is received by other data stations; i.e., the data is transmitted and received among the process line controllers. In FIG. 11, reference numerals 46-1-46-n and 56-1-56-n illustrate receiver and transmission data between program computers.

Although the above-mentioned embodiment has dealt with the case in which two or three data stations are connected to the process line controller, the number of the data stations may of course be selected depending upon the design requirements.

In the above-mentioned embodiment, furthermore, transmission units for sensor bases and transmission units for process line controllers are employed in the data stations connected to the process line controllers. However, it is also allowable to use either the transmission units for sensor bases only or the transmission units for process line controllers only, for both purposes.

According to the present invention as mentioned above, the data are transmitted and received being superposed on the signals that are cyclically transmitted from the process line controllers to the sensor bases or that are transmitted from the sensor bases to the process line controllers. Therefore, the data transmission equipment can be simply constructed to efficiently transmit the data in large quantity, or to transmit data having various natures of the processing units.

What is claimed is:

1. A data transmission equipment comprising:
    a plurality of data stations connected in series through a loop transmission path;
    a display board connected to at least one of said data stations to set and display the data;
    a process line controller connected to one of said data stations;
    a synchronizing station connected between said data station that is connected to said display board and said data station that is connected to said process line controller;
    a sensor base connected between another of said data stations and process control apparatus;
    each of said data stations including a buffer memory having addresses for storing input/output signals, said signals being transmitted via said transmission line and said buffer memory;
    said data transmission equipment further comprising a multiplexer and a demultiplexer, an address counter which cyclically scans the addresses of said multiplexer and of said demultiplexer, an address selector for switching the addresses in said buffer memory, a data selector for switching the input data of said buffer memory, an output memory and an output buffer memory for holding the contents of said buffer memory until said contents are stored in said output memory.

* * * * *

UNITED STATES PATENT AND TRADEMARK OFFICE
CERTIFICATE OF CORRECTION

PATENT NO. : 4,570,259
DATED : February 11, 1986
INVENTOR(S) : Tetsuo Ishii

It is certified that error appears in the above-identified patent and that said Letters Patent is hereby corrected as shown below:

On the title page and at column 1, in the title, first line, delete the word "ON".

Signed and Sealed this

Twenty-second Day of July 1986

[SEAL]

Attest:

DONALD J. QUIGG

Attesting Officer

Commissioner of Patents and Trademarks